No. 820,741. PATENTED MAY 15, 1906.
J. SINNOTT.
WHEEL.
APPLICATION FILED JULY 10, 1905.

2 SHEETS—SHEET 1.

WITNESSES:
M. M. Hamilton
Rowley B. Wood

INVENTOR
John Sinnott
BY
Harding & Harding
ATTORNEYS.

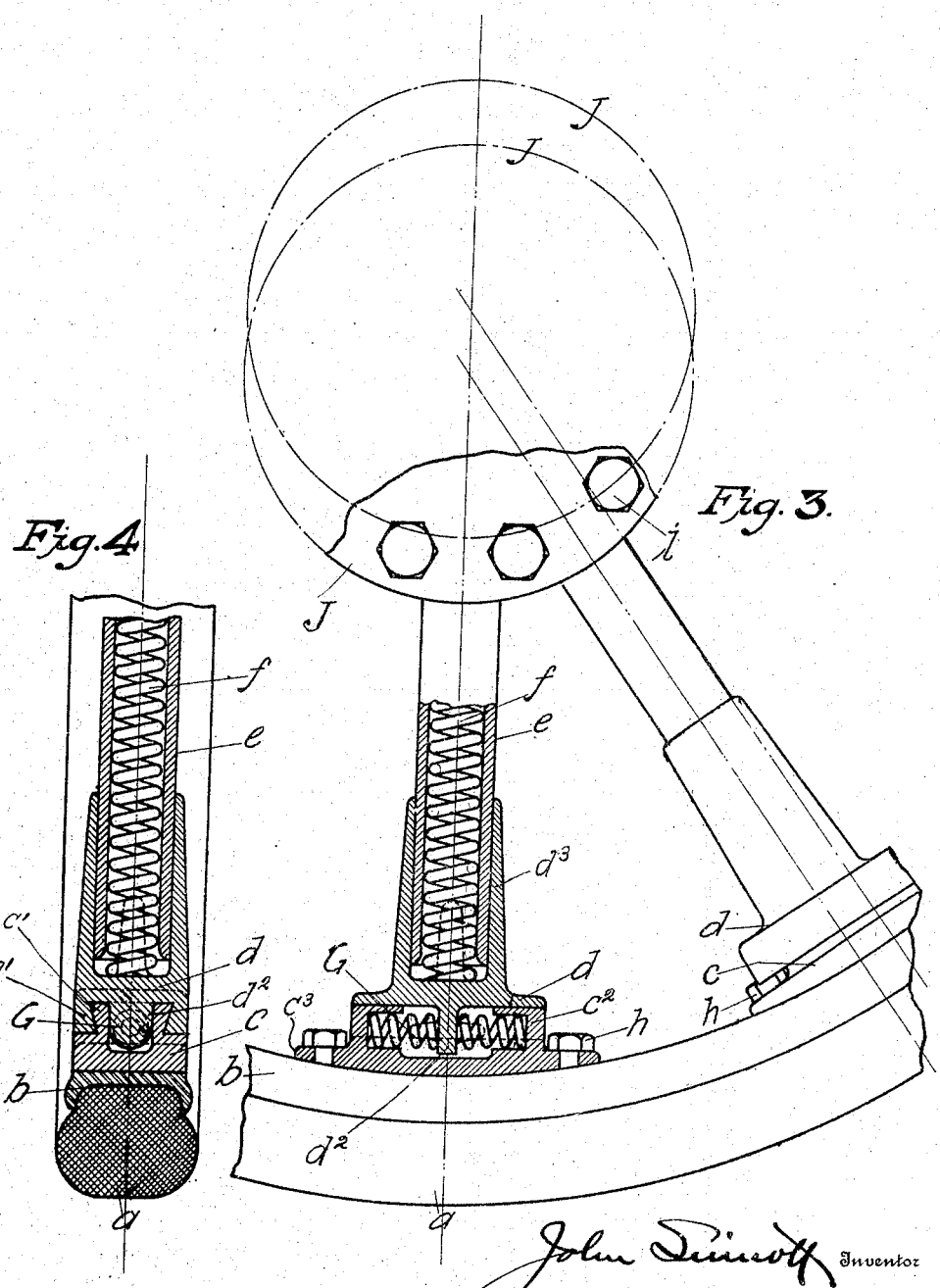

UNITED STATES PATENT OFFICE.

JOHN SINNOTT, OF PHILADELPHIA, PENNSYLVANIA.

WHEEL.

No. 820,741.

Specification of Letters Patent.

Patented May 15, 1906.

Application filed July 10, 1905. Serial No. 268,969.

*To all whom it may concern:*

Be it known that I, JOHN SINNOTT, a citizen of the United States, residing at Philadelphia, in the county of Philadelphia and State of Pennsylvania, have invented a new and useful Wheel for Automobiles and other Vehicles, of which the following is a specification.

The object of the invention is to absorb shocks to the vehicle without the use of pneumatic or other similar tires.

The invention consists in a new and improved construction and arrangement of hub, spokes, and shoes, as hereinafter more particularly described, whereby the rim has a limited elastic circumferential movement relatively to the spokes and a similar movement radially to the hub.

Figure 1:
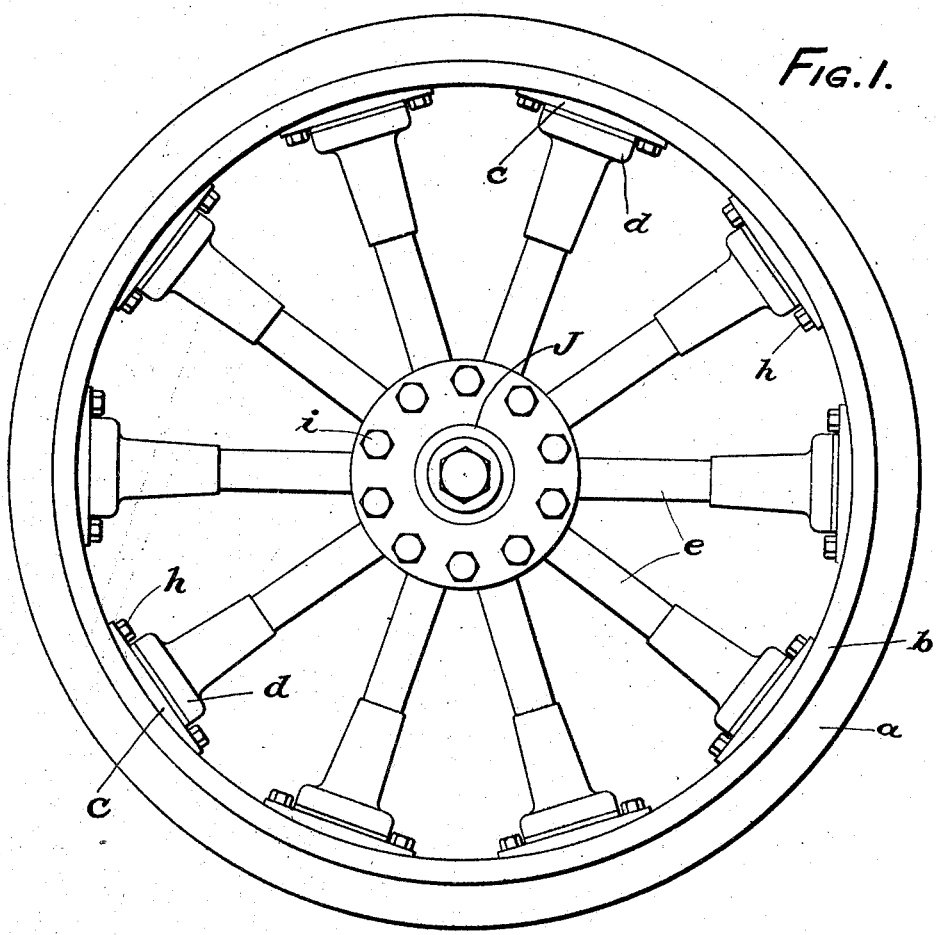
Figure 2:
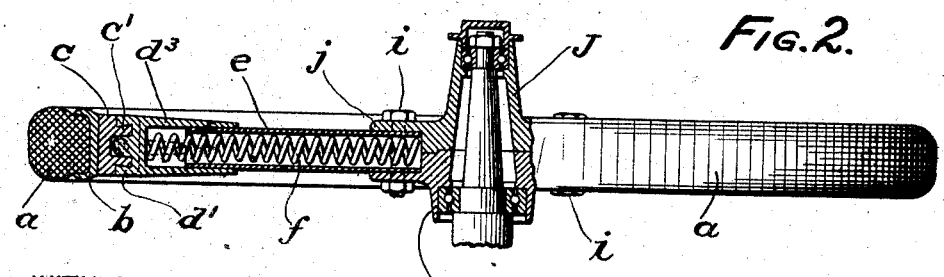

In the drawings, Figure 1 is a side elevation of the improved wheel. Fig. 2 is an end elevation in partial section. Fig. 3 is a detailed side elevation on an enlarged scale. Fig. 4 is a detailed end elevation on an enlarged scale.

$a$ is the tire, and $b$ the rim.

$c$ represents the outer shoes, having tapered side flanges $c'$, end walls $c^2$, and end flanges $c^3$.

$h$ represents riveted bolts, by means of which the flanges $c^3$ are secured to the rim.

$d$ represents the inner shoes, having tapered side flanges $d'$, embracing the side flanges $c'$ of the shoe $c$, and central projections $d^2$, which extend within the outer shoes $c$. G G are springs confined between the projections $d^2$ of shoes $d$ and the end walls $c^2$ of shoes $c$. The shoes $d$ comprise also radially inwardly extending hollow or tubular arms $d^3$, within which extend the tubular spokes $e$.

The hub is made of two parts or sections J J, abutting against each other, the said parts having annular flanges $j\ j$, respectively recessed on their opposing faces adjacent to their outer edges to receive the tubular spokes $e$. The spokes $e$ are held in place and the two parts of the hub secured together by means of bolts $i$, extending through the abutting flanges and arranged alternately with the spokes, each spoke thus extending the full length of the spokes and being confined between the hub and the several inner shoes.

It will be understood that in practice the spokes of the wheel ride backward or forward with relation to the rim in a circumferential direction, dependent upon the point of application of force upon the rim, the shoes sliding relatively to each other in a longitudinal direction against the pressure of one spring or the other. At the same time the part of the rim to which force is applied moves inwardly toward the hub by reason of the sliding connection between the spokes and the inner shoes, this relative motion of rim and hub being against the pressure of the springs within the spokes. The tapered sides of the shoes lock them from relative movement, except in a longitudinal direction, and make the mechanism dirt-proof. The construction is strong, durable, and sightly.

Having now fully described my invention, what I claim, and desire to protect by Letters Patent, is—

1. A vehicle-wheel comprising a hub, a rim, outer shoes secured to the rim, inner shoes engaging, and movable circumferentially relatively to, the outer shoes respectively, tubular spokes securing to the hub and engaging, and movable radially relatively to, the inner shoes respectively, springs between the hub and the inner shoes, and springs between the inner and outer shoes.

2. A vehicle-wheel comprising a rim, a hub, tubular spokes connected to the hub, inner shoes having tubular arms engaging the tubular spokes respectively, springs within the spokes confined between the inner shoes and the hub, outer shoes secured to the hub and engaging the inner shoes and springs extending at right angles to the radius of the wheel and confined between the two shoes of each pair.

3. A vehicle-wheel comprising a two-part hub having recesses extending radially inward, tubular spokes extending into the recesses of both parts of the hub, means securing the hub parts together and securing the spokes in position, inner shoes having inwardly-extending tubular arms into which the spokes respectively extend, springs one within each spoke and confined between the hub and the shoe, a rim, outer shoes secured to the rim, two shoes of a pair having mutually engaging side flanges, and springs confined between the two shoes and permitting a limited relative movement between them in a circumferential direction.

4. A vehicle-wheel comprising a rim, a hub, outer shoes secured to the rim, inner shoes respectively engaging the outer shoes, a spring between the two shoes of a pair permitting the rim and the shoe secured thereto to move circumferentially with respect to the inner shoe, tubular spokes connected to the hub and engaging respectively the inner shoes and movable radially relatively thereto, and springs within the spokes and confined within the hub and the inner shoes.

5. A vehicle-wheel comprising a rim, a hub, spokes connected thereto, shoes one connected with the outer end of each spoke, shoes corresponding in number secured to the rim, each of said shoes having side flanges, the side flanges of one shoe fitting within the side flanges of the other shoe of the pair, one of said shoes having a central projection and the other end walls, and springs between said projection and said end walls.

6. A vehicle-wheel comprising a two-part hub having recesses extending radially inward, tubular spokes extending into said recesses, inner shoes one at the outer end of each spoke and movable radially thereon, springs one within each spoke and confined between the hub and the inner shoe, a rim, outer shoes secured to the rim, and connections between the inner and outer shoes whereby the rim is capable of a limited movement circumferentially with respect to the inner shoes, spokes and hubs.

7. A vehicle-wheel comprising a two-part hub having complementary abutting flanges extending radially outward, the abutting ends of the flanged portions of the hub being recessed to receive the spokes, tubular spokes extending within the recessed portions of the hub, bolts, one on each side of each spoke, extending through the flanges of the hub-sections and clamping the spokes in place, inner shoes having radially-extending tubular arms engaging the outer ends of the tubular spokes, springs, each extending within its corresponding tubular arm and tubular spoke and engaging, at its respective ends, the corresponding shoe and the hub, a rim, and means connecting the inner shoes with the rim.

8. A vehicle-wheel comprising a rim, a hub, spokes connected thereto, shoes one connected with the outer end of each spoke, other shoes secured to the rim, the first shoes each having tapered side flanges and a central projection and the second shoes each having tapered side flanges engaging the flanges of the first shoe, end walls and end flanges secured to the rim, and springs confined between the projection on the first shoe and the end walls of the second shoe.

9. A vehicle-wheel comprising a rim, a two-part hub having complementary abutting flanges extending radially outward, the abutting ends of the flanged portions of the hub being recessed to receive the spokes, tubular spokes extending within the recessed portions of the hub, bolts arranged alternately to the flanges of the spokes, extending through the flanges of the hub-sections and clamping the spokes in place, a shoe for each spoke having an inwardly radially extending tubular arm within which the outer end of the corresponding spoke extends and a foot portion having tapered side flanges and a central projection, springs one within each tubular spoke and confined between the hub and the shoe, a second shoe having tapered side flanges engaging the flanges of the first shoe, end walls and end flanges secured to the rim, and springs confined between the projection on the first shoe and the end walls of the second shoe.

In testimony whereof I have signed my name to this specification in the presence of two subscribing witnesses.

JOHN SINNOTT.

Witnesses:
W. PRESTON ZOHN,
DAVID W. HOFFMAN.